Inventor:
J. W. Thompson,
by Lester L. Sargent
Atty

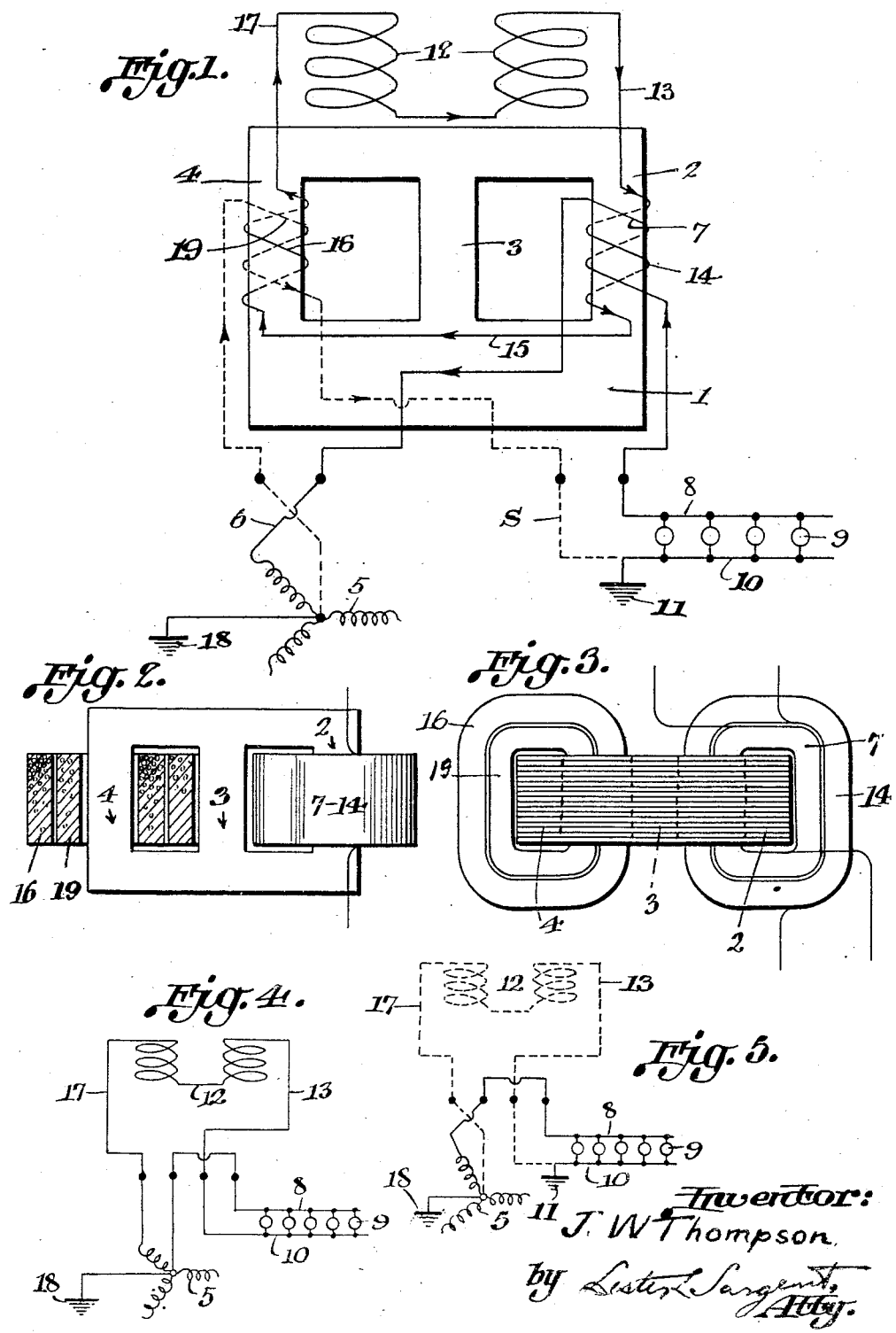

Patented Feb. 16, 1932

1,845,101

UNITED STATES PATENT OFFICE

JOHN W. THOMPSON, OF PUEBLA, MEXICO

FRAUD PREVENTION SYSTEM FOR ELECTRIC METERING

Application filed May 10, 1930. Serial No. 451,484.

The object of my invention is to provide a novel fraud prevention system for electric metering including a special series transformer to be used with house meters to prevent fraud. I obtain the object of my invention by the means illustrated in the accompanying drawings, in which—

Fig. 1 is a diagrammatic view of the invention, with a fraudulent connection to ground shown at 11. The attempted fraud consists in the customer connecting one side of his installation to ground, as shown at 11, after transposing the entrance leads as shown at 6. The dotted lines show the part of the circuit shunted out by this connection;

Fig. 2 is a view partly in section and partly in side elevation, of my special series transformer;

Fig. 3 is a top plan of my special series transformer;

Fig. 4 is a diagrammatic view of a normal circuit before my special series transformer is applied;

Fig. 5 is a diagrammatic view of the same circuit, grounded and the entrance leads transposed, as would fraudulently be done to make the meter inoperative by shunting out the current coils. The current in this case follows the path through the earth from the fraudulent ground at 11 to the system ground at 18 instead of through the coils 12 of the meter.

Like characters of reference designate like parts in each of the views.

Figure 6:
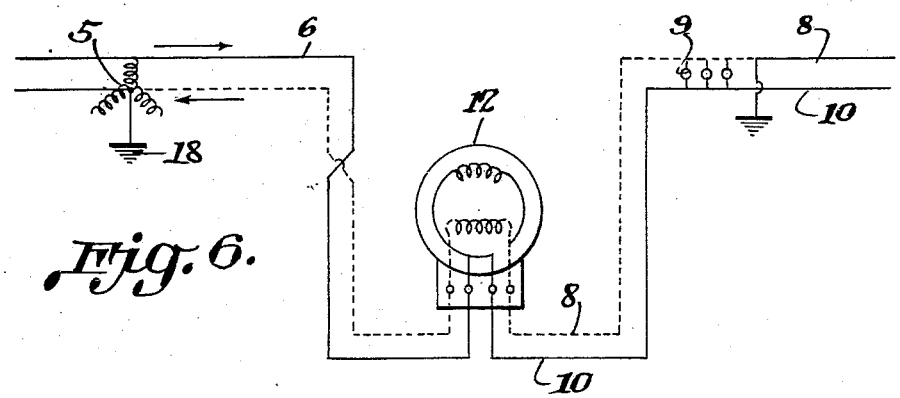
Fig. 6 is a diagrammatic view of a three phase four wire grounded neutral system showing fraudulent ground connections used to beat the meter, the current coils of the meter being shunted out as indicated by dotted lines.
Figure 7:
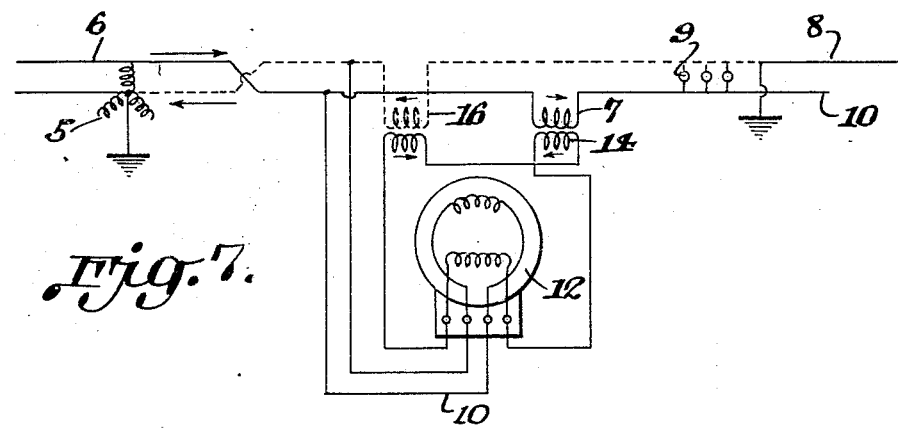
Fig. 7 is a diagrammatic view of my invention showing the special connections used to prevent fraud, the part of the circuit shunted out being indicated by dotted lines and the phase wire by heavy lines.
Figure 8:
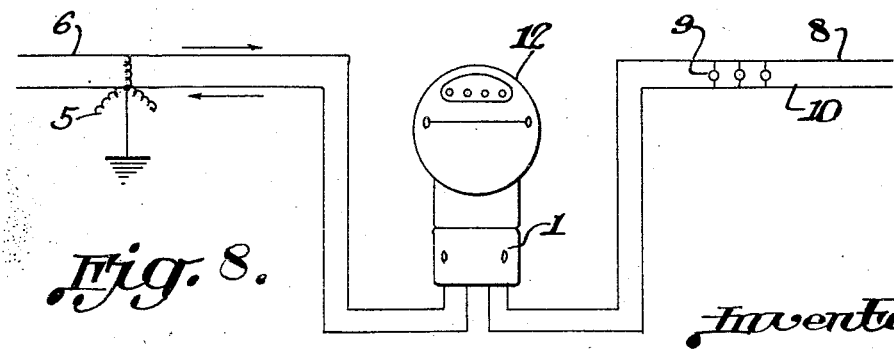
Fig. 8 is a diagrammatic view of my invention with the anti-theft device or special series transformer shown in its relation to the meter in front plan.

Referring to the accompanying drawings, Fig. 1, I provide a series transformer 1, having the cores 2 and 4, and the intermediate core element 3. I provide a primary winding 7 and a secondary winding 14 for the transformer core 2. In like manner I provide a primary winding 19 and a secondary winding 16 for core 4.

Referring to Fig. 1, the numeral 12 designates the current coils of the house meter, one of these coils being connected by the wire 13 with the secondary winding 14 of one side of the series transformer; while the wire 17 connects the meter with the secondary winding 16 of the other side of the series transformer. A wire 15 connects one side of the transformer with the other side to put the secondary windings in series, as shown in Fig. 1.

The letter S indicates the part of the circuit shunted out by the fraudulent ground connection marked 11 in Fig. 1.

In Fig. 4 there is illustrated the conventional wiring to a meter without my invention. In Fig. 5 there is illustrated the same wiring but with a fraudulent ground connection 11 connected to wire 10 to avoid the meter, the dotted lines showing the part of the circuit shunted out by the aforesaid fraudulent ground connection 11. It will be noticed that the meter coils are included in the part of the circuit shunted out, thus rendering the meter inoperative, making it possible for the customer to use an unlimited amount of current without it being registered on the meter.

In Fig. 1 my invention is illustrated with the fraudulent connection to ground shown at 11, the dotted line S indicating the part of the circuit shunted out by the aforesaid fraudulent ground 11. With my invention connected in a circuit as shown in this figure, the attempt to defraud the meter would fail as normal current would be maintained in the meter coils through the inductive action of the primary winding 7 on the secondary 14, in which secondary winding are connected the series coils 12 of the meter. That the fraudulent connection has a negligible effect on the registration of the meter with the special series transformer connected in circuit, has been abundantly proved by the applicant with a working model of his invention.

The object of the intermediate core element 3 is as follows:

Referring to Fig. 1, when conditions in the circuit are normal and no fraudulent ground exists on the customer's premises the currents in the windings on cores 2 and 4 are equal, and they are connected in such a manner that the magnetic flux from core 2 to core 4, and vice versa, passes through the yokes of the transformer core; that is to say, no flux under this condition passes through the intermediate core element 3. However, when a ground exists as shown at 11 in Fig. 1, the magnetic balance which previously existed between the cores 2 and 4 is destroyed, since the connecting of this ground is in effect a short circuit on the primary winding 19 of the transformer element wound on core 4. Under this condition the windings on core 4 exert a strong counter magnetic effect, forcing the flux to follow the path through the intermediate core element 3, only enough flux passing through core element 4 to maintain normal current in the short circuited winding 19.

What I claim is:

1. In a fraud prevention system for electric metering adapted to register stolen current on the meter, the combination of a line wire, a transformer having windings on spaced cores and having intermediate core on which there is no winding, a house meter having one of its current coils connected with the secondary winding of one side of the series transformer and having another coil connected with the secondary winding of the other side of the series transformer, a wire connecting one side of the transformer with the other side to put the secondary windings in series, a load wire connected with the primary winding of the side of the series transformer to which the line wire is connected, and an electrical conduit connecting the line wire with the ground.

2. In a system for preventing fraudulent use of electric current adapted to register on the meter current attempted to be stolen, the combination of an electric meter for the registration of current used, a transformer having balanced sets of transformer windings and having an intermediate core between said windings, a wire connecting the secondary windings of the transformer in series, a wire leading to and from the load, said transformer being interposed between the electric house meter and the load wire, one of the wires to the meter being connected with one side of the transformer windings and the other wire to the meter being connected to the other side of the transformer windings, whereby a fraudulent connection with the wiring will have a negligible effect on the registration of the meter.

3. In a system for use in connection with current distribution systems to prevent fraudulent use of current, the combination of an electric meter for registration of all current used whether properly or otherwise, a transformer electrically connected with the meter, said transformer comprising a series of three cores, the outer cores having a primary and a secondary winding and the intermediate core being without a winding, a wire connecting the secondary windings of the cores, a load wire connected with the primary winding on one side of the transformer and a line wire connected with the same primary winding of said core of the transformer, for the purposes described.

JOHN W. THOMPSON.